Dec. 10, 1940.   E. L. ASCHENBACH ET AL   2,224,333
CONCEALED TRAP FOR INTERNAL SIPHON GAUGE
Filed Nov. 30, 1936

Inventor
Emerson L. Aschenbach
Bert McClelland

By Strauch & Hoffman
Attorneys

Patented Dec. 10, 1940

2,224,333

UNITED STATES PATENT OFFICE 2,224,333

CONCEALED TRAP FOR INTERNAL SIPHON GAUGE

Emerson L. Aschenbach, Sellersville, and Bert McClelland, Perkasie, Pa., assignors to United States Gauge Company, New York, N. Y., a corporation of Pennsylvania Application November 30, 1936, Serial No. 113,522

9 Claims. (Cl. 73—109)

This invention relates to pressure gauges and especially to gauges embodying a pressure responsive element, such as a Bourdon tube, wherein it is necessary or desirable that some means be provided to prevent the entry of high temperature fluid, as for example steam, into said pressure responsive element to cause damage or affect the operating characteristics of said element.

In gauges of this type it is a common practice to employ a liquid trap or siphon for the purpose mentioned above and such trap usually takes the form of a looped tube connecting the gauge with the source of fluid the pressure of which is to be measured. This looped tube or "pigtail" as it is called, was formerly located in an exposed position where it was subject to damage and was also unsightly, and it has therefore been proposed to locate the trap or siphon within the gauge casing where it is not only concealed from view but is also protected. However, concealed or internal traps of the tubular or pigtail type involve relatively complicated tubing arrangements and assembling operations, or costly modifications of the gauge structure itself. This invention is concerned principally with improvements in traps or siphons which are to be located entirely within the casing of the gauge.

A principal object of our invention therefore is to provide a concealed or internal trap or siphon for pressure gauges of this type which is simple in construction, easy to produce and positive and efficient in operation.

Another object of our invention is to provide a concealed or internal siphon or trap which is formed entirely within the usual post or socket member, or partially within the same and a portion of the pressure responsive element, whereby no extra parts are required and costly modifications of existing gauge structures obviated.

A further object of our invention is to provide a trap or siphon which is formed by a plurality of passages arranged within the usual post or socket member in such a manner as to permit them to be easily produced by a simple drilling operation.

A still further object of our invention is to provide a trap or siphon which, being located within the usual post or socket member, is not subject to injury and does not occupy any extra space within the gauge casing.

The above and other objects will become apparent from a study of the following detailed description and its appended claims when taken with the accompanying drawing, wherein:

With continued reference to the drawing wherein like numerals are employed to designate the same elements and particularly referring to Figure 1.

Figure 1:
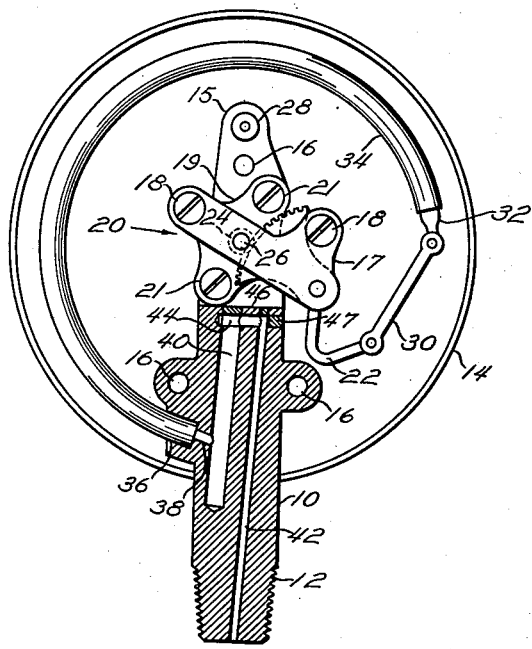
Figure 1 is a front elevation, partially in section of a gauge embodying our invention, and with certain parts omitted for clarity.

The usual post or supporting member 10 is provided at its lower end with a threaded portion 12 for connection with a pipe leading from a source of fluid under pressure. The member 10 is provided with a plurality of threaded apertures 16—16—16 which receive suitable screws for securing the usual casing 14 thereto.

The numeral 20 indicates generally a conventional movement and pointer shaft assembly comprising: frame members 17 and 19, assembled by screws 18—18 and secured to a relatively thin upwardly extending portion 15 of the post or socket member 10 by screws 21—21; a geared quadrant 22 in mesh with a pinion 24; and a pointer shaft 26. The pointer shaft extends forwardly through an aperture in a dial, not shown, which may be conveniently mounted on either the front face of element 10 or of its portion 15, and on a boss 28 carried thereby. The quadrant 22 is operatively associated with a pressure responsive device 34, illustrated in the form of a Bourdon tube, by means of a link 30 and an apertured member 32 secured to the free end of said Bourdon tube.

The foregoing gauge mechanism forms no part, per se, of the present invention and our improved traps or siphons may be obviously associated with various other types of gauge mechanisms.

As can be seen from Figure 1 the post or socket member 10 is shouldered at 46 so that the upper extension 15 thereof, which carries the gauge mechanism, is of much less thickness than the lower portion thereof. An opening or socket 36 is provided in said lower portion at a point considerably below the shoulder 46 and adjacent to but inside of the casing 14. In this opening is secured, by means of solder or any other suitable means, the pressure responsive element 34.

The post or socket member 10 is also provided with a plurality of ducts or passages which form our improved trap or siphon. These ducts may be conveniently formed by drilled holes suitably plugged as at 47 or in any other convenient manner and are arranged as follows. One small passage 42 extends vertically upwards from the threaded end 12 of the post 10 to a point adjacent to the shoulder 46. Parallel to but spaced from the passage 42 is a passage 40 which communicates with the passage 42 by means of a cross passage 44. The passage 40 which is of considerably larger cross section than passage 42, is connected at its lower end with the socket 36 and hence with the interior of the pressure responsive element 34 by a passage 38. This passage 40, together with the lower portion of said responsive element forms a liquid trap of considerable volume for condensed fluid. The passages 42—40—44 are in the shape of an inverted U, one branch of which opens exteriorly of the post 10 while the other branch communicates with the pressure responsive element.

The operation of the improved trap shown in Figure 1 is briefly as follows. The fluid under pressure, such as steam enters through the duct or passage 42 and is discharged into the downwardly extending passage 40 through the cross passage 44. In the case of steam, condensation takes place within the passage 40 and eventually this passage as well as the lower portion of the pressure responsive element 34 will be filled with a body of water to the level indicated. This body of water prevents the entry of high temperature steam into the responsive element with the attendant deleterious results mentioned above. It is preferable, but not essential that the volumetric capacity of the liquid trap be approximately equal to the volumetric capacity of the responsive element and the capacity of the trap may obviously be varied by changing the diameter and/or length of the passage 40. The passage 40 may also be increased in size and capacity by being formed to two overlapping drilled openings arranged in a vertical plane transverse to the plane of Figure 1.

As noted above, it is not essential that the liquid trap have a volumetric capacity equal to that of the Bourdon spring or pressure responsive element. This is due to the fact that a body of air is trapped and compressed within the pressure responsive element and also because a certain amount of liquid will be pushed forward into and will remain in the end portion of said element. Hence the body of liquid contained in the trap need only be sufficient to fill the Bourdon spring tube, when taken with the body of compressed air and liquid therein, when the trap liquid is forced ahead by the steam pressure. This will be sufficient to prevent hot steam from entering the tube. However, it is possible, as illustrated in Figures 2 and 3, to arrange a series of ducts within a socket member to provide a trap having a volume equal to the entire capacity of the Bourdon spring element; a trap of this size affording more complete protection even at the start of operation or when the pressure being measured is great enough to compress the air in said element to a negligible volume.

Figure 2:
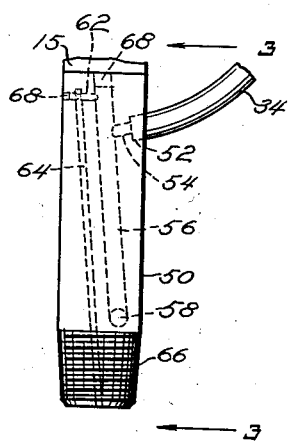
Figure 2 is a view of a modification, with the Bourdon tube fragmentarily shown, and with the casing and other post-supported parts omitted.
Figure 3:
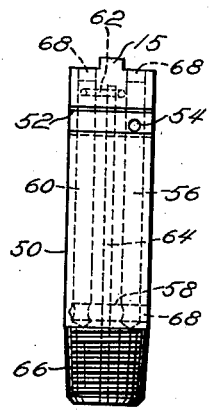
Figure 3 is a view of this modification with the Bourdon tube completely removed, and taken at right angles to Figure 2 in the direction of the arrows 3—3.

In Figures 2 and 3 such a modification of the trap or siphon is illustrated. In these figures, a post or socket member 50, equivalent to element 10 of Figure 1 is shown. The gauge mechanism (not shown) is carried by suitable means 15 above the upper end of the post member 50 and is operatively connected with a pressure responsive element such as a Bourdon tube 34, in the usual manner. Near its upper end the post member 50 is provided with a lateral slot forming a socket 52 in which is secured this Bourdon tube element in a manner similar to that shown in Figure 1.

In this form of our invention the liquid trap or siphon is formed entirely within the member 50 by means of a series of ducts or passages arranged generally as follows. Two parallel but spaced passages 60 and 56 extend from the top into the lower portion of the member 50, at an angle to the vertical axis thereof, and are connected at their lowermost ends by a transverse passage 58. A smaller passage 64 is connected to the upper end of passage 60 by a cross passage 62, and extends downwardly, parallel to the passages 56 and 60 through the threaded end portion 66 of the post 50, terminating centrally of the tip end of said portion 66 for communication with a source of fluid pressure. The upper end of passage 56 is connected to the responsive element by means of a passage 54. These passages preferably take the form of drilled holes suitably plugged as at 68 as in the case of the ducts or passages shown in Figure 1. As can be best seen in Figure 3 the passages 56—58—60 form a U-shaped trap or siphon contained entirely within the post element 50.

It is noted that by inclining the passages 56, 60 and 64, as above set forth, it is possible to make the passages 56 and 60 of ample size and yet position them, along with passage 64, within a post or socket member of small cross section. This arrangement permits the passages 56, 58 and 60, which form the trap to be large enough to contain a body of liquid substantially equal to the volumetric capacity of the Bourdon tube 34.

In this modification the steam or other pressure fluid enters the gauge through the small passage 64 and is discharged through the passage 62 into the U-shaped trap formed by passages 56—58—60. Condensation takes place in the trap or siphon until said trap is filled with liquid up to or above the level of passage 62. As previously pointed out this body of liquid is equal in volume to the capacity of the Bourdon spring element. While a small portion of this condensed liquid is also present in the lowermost portion of the responsive element, due to the relative levels of passage 62 and opening 52 as shown, it is of course possible to lower the level of passage 62 or raise that of opening 52 so the trap or siphon is entirely within the post member 50. The small diameter of the passage 64 materially enhances condensation within the trap as can be readily understood.

Thus it is seen that we have provided novel and improved trap or siphon means for pressure gauges that are wholly or partially within the usual post or socket member; which are simple to construct, requiring no additional elements or costly manufacturing steps; and which are positive and efficient in operation.

While two specific embodiments of our invention have been described, it is of course obvious that various other forms may be provided and that other arrangements of ducts within the post or socket member may be resorted to to obtain our improved results. The present embodiment is therefore to be considered as in all respects illustrative and not restrictive; the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gauge of the type described, a one piece post or socket member, a pressure responsive device mounted thereon, and passage means within said post or socket member and formed directly therein for connecting said device with a source of fluid under pressure, said passage means extending upwardly from the exterior of said post or socket member and then downwardly directly within said post or socket member and to a point of connection to said device and being of sufficient volumetric capacity to provide a liquid trap for adequately protecting said pressure responsive device from contact with said fluid under pressure during normal operation.

2. In a steam pressure gauge or the like, a one-piece substantially vertical socket post, a pressure responsive device comprising a Bourdon tube mounted on said post and elongated passage means formed within said post for connecting said Bourdon tube with a source of steam under pressure, said passage means extending upwardly from the bottom of said post and then downwardly directly within said post and to a point of connection to said Bourdon tube and being of sufficient volumetric capacity to provide a liquid trap for adequately protecting said Bourdon tube from being contacted by said steam during normal operation.

3. In a gauge of the type described, a socket member, a pressure responsive device carried thereby, said socket member being provided with passage means therein forming a liquid trap and adapted to connect said pressure responsive device to a source of fluid pressure, said passage means comprising a series of drilled openings leading upwardly from the lowermost portion of said socket to a point adjacent the top thereof and thence downwardly to said pressure responsive device and being of substantially the same volumetric capacity as said pressure responsive device so as to adequately protect the latter against direct exposure to said fluid.

4. In a gauge of the type described, a post or socket member of restricted size, a pressure responsive element mounted on said post, a series of drilled passages within said member intersecting each other to form a continuous duct, said passages providing a fluid entrance and a liquid trap of substantially the same volumetric capacity as said pressure responsive element so as to adequately protect the same against direct exposure to said fluid, and a passage within said member connecting said trap with said pressure responsive element.

5. In a gauge of the type described, a socket member, a pressure responsive device secured to said socket member at a point materially below the top portion thereof and extending upwardly therefrom above said top portion, said socket member being provided with passage means formed directly therein for connecting said responsive device to a source of fluid pressure; said passage means comprising a vertical passage leading from the lowermost portion of said socket member to a point adjacent to said top portion and a passage leading downwardly from said top portion and connected at its upper end with said first named passage and at its lower end with said responsive device, and said passage means being of sufficient volumetric capacity to provide a liquid trap for adequately protecting said pressure responsive device from contact with said fluid under pressure during normal operation.

6. In a gauge of the type described, a socket member, a pressure responsive device secured thereto at a point below the top of said socket and extending upwardly therefrom, said socket member being provided with passage means formed directly therein and adapted to connect said responsive device to a source of fluid pressure, said passage means being in the form of an inverted U having its upper portion positioned well above the point of securement of said responsive device to said socket with one of the ends of said passage opening to the exterior of said socket and the other end connected to said responsive device, and said passage means being of sufficient volumetric capacity to provide a liquid trap for adequately protecting said pressure responsive device from contact with said fluid under pressure during normal operation.

7. In a gauge of the type described, a socket member provided with an opening adapted to receive a pressure responsive device, a substantially U-shaped liquid trap within said socket member, and passage means connecting said trap with said opening and another passage means leading from said trap to the exterior of said socket member.

8. In a gauge of the type described, a socket member provided near its top with an opening adapted to receive a pressure responsive device, said socket member being provided with passage means leading from said opening to a source of fluid pressure, and including a substantially U-shaped liquid trap formed of communicating passages of considerable cross-sectional area, passage means connecting the upper end of one branch of said liquid trap with said opening and passage means leading from the upper end of the other branch of said trap to the exterior of said socket member, said last named passage being of relatively small cross-section as compared to said trap forming passages.

9. In a gauge of the type described, a socket member adapted to support a pressure responsive device, said socket member being provided with spaced vertical passages closed at each end, a transverse passage connecting the lower ends of said passages, passage means for connecting the upper end of one of said vertical passages with a pressure responsive device, and passage means for connecting the other of said vertical passages with a source of fluid pressure, said vertical passages and said transverse passage forming a liquid trap within said socket member.

EMERSON L. ASCHENBACH.
BERT McCLELLAND.